United States Patent [19]
Davis et al.

[11] Patent Number: 5,059,363
[45] Date of Patent: Oct. 22, 1991

[54] METHOD FOR EXTRUDING SILICONE TUBING

[75] Inventors: Charles R. Davis, Des Plaines; Jeffrey T. Williams, Round Lake, both of Ill.

[73] Assignee: Uresil, Inc., Skokie, Ill.

[21] Appl. No.: 650,427

[22] Filed: Feb. 4, 1991

[51] Int. Cl.⁵ ..................... B29C 47/00; G01B 07/04; G01B 07/12
[52] U.S. Cl. .................. 265/40.1; 264/40.2; 264/40.7; 264/209.1; 425/140; 425/141
[58] Field of Search ................. 264/40.1, 40.2, 209.1; 425/40.7, 140, 141

[56] References Cited

U.S. PATENT DOCUMENTS

| | | | |
|---|---|---|---|
| 2,682,144 | 3/1954 | Hare | 265/40.1 |
| 3,699,197 | 10/1972 | Egger | 264/40.7 |
| 4,095,156 | 6/1978 | Borisov et al. | 425/135 |
| 4,124,340 | 11/1978 | LaSpisa et al. | 425/135 |
| 4,152,380 | 5/1979 | Graves et al. | 264/40.7 |
| 4,425,289 | 1/1984 | Lee et al. | 264/40.1 |
| 4,520,672 | 1/1984 | Saint-Amour | 425/141 |
| 4,911,868 | 3/1990 | Reifen hüsen et al. | 264/40.2 |

Primary Examiner—Hubert C. Lorin
Assistant Examiner—Angela Ortiz
Attorney, Agent, or Firm—Laff, Whitesel, Conte & Saret

[57] ABSTRACT

A method for extruding silicone tubing which maintains consistently precise dimensions in the final tubing product by continuously monitoring the tubing profile after cooling and adjusting the height the loop of uncured tubing as necessary to neck the tubing down to the desired size.

7 Claims, 1 Drawing Sheet

METHOD FOR EXTRUDING SILICONE TUBING

BACKGROUND OF THE INVENTION

This invention relates generally to methods for extruding elastomeric tubing and, more particularly, to improved methods for extruding silicone tubing.

In the course of manufacturing silicone tubing by extrusion, operational parameters such as temperature, material viscosity and speed typically drift, resulting in undesirable variations in the tubing dimensions. It is therefore an object of the present invention to provide an improved method for making silicone tubing which automatically compensates for variations in system parameters, in order to maintain consistently precise dimensions in the final tubing product.

SUMMARY OF THE INVENTION

The present invention is therefore directed to a method for extruding tubing which maintains consistently precise dimensions in the final tubing product in which silicone rubber is extruded through a pin and die to produce uncured tubing which may be of circular, oblong and other cross-sectional profiles. A loop of predetermined height is formed from the uncured tubing in order to neck the dimensions of the tubing down to a predetermined value, and it is passed through an oven to vulcanize or cure the tubing. The tubing is then cooled, an electrical signal indicative of the outside diameter of the tubing is generated, and the height of the loop is adjusted to compensate for variations in the outside diameter of the tubing from the predetermined value.

BRIEF DESCRIPTION OF THE DRAWINGS

The features of this invention which are believed to be novel are set forth with particularity in the appended claims. The invention, together with the objects and the advantages thereof, may be best understood by reference to the accompanying drawings, designated FIG. 1, which is a perspective view of an apparatus used in the practice of the method of the invention, and FIG. 1A which is an enlarged cross-sectional side view of the pin and die used in the apparatus of FIG. 1.

DESCRIPTION OF THE PREFERRED EMBODIMENTS

The practice of the method of this invention is described below in connection with the apparatus of FIG. 1, using silicone rubber as the extrudate, although other thermosetting materials may be used.

Figure 1:
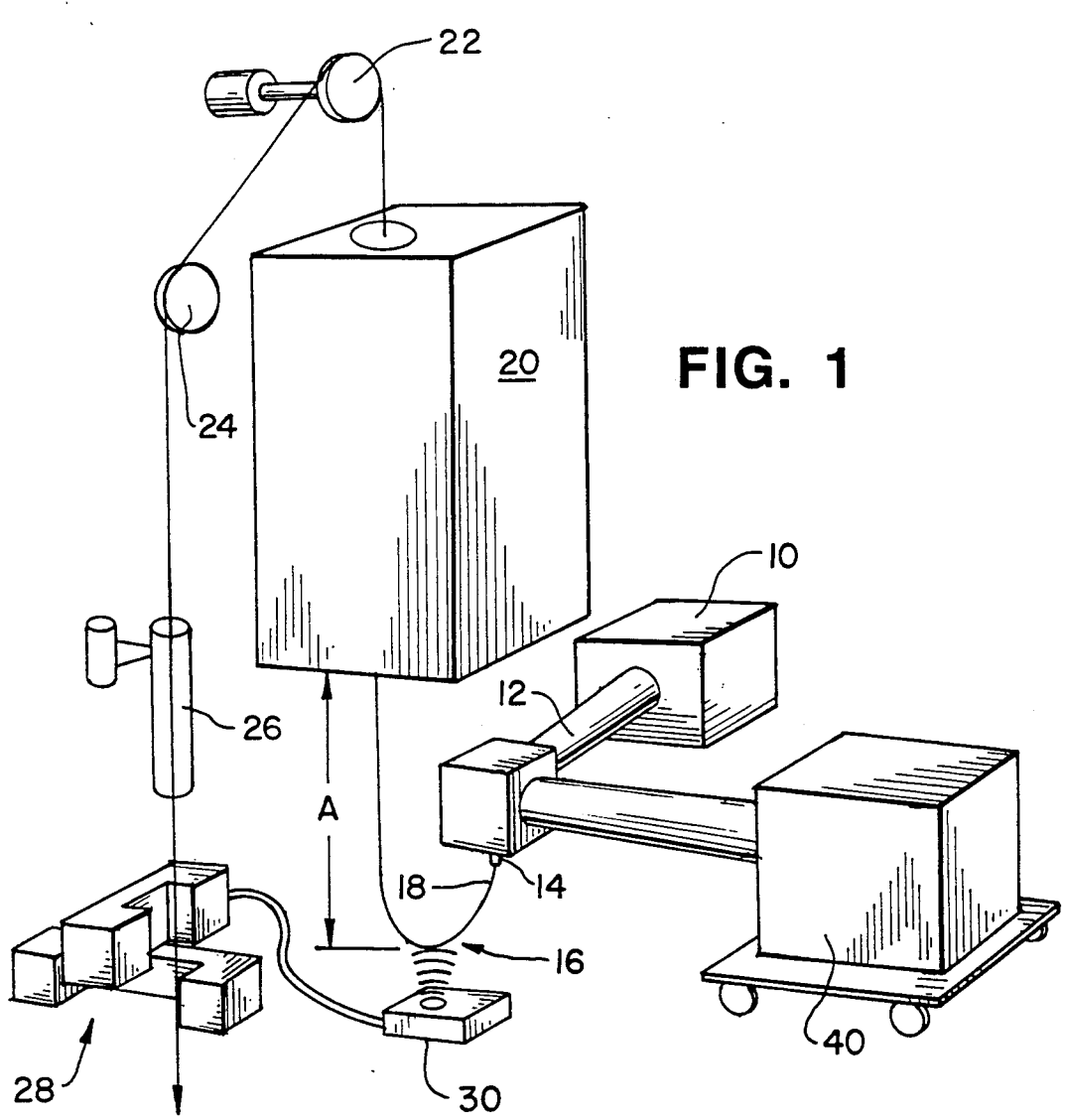
Figure 1A:
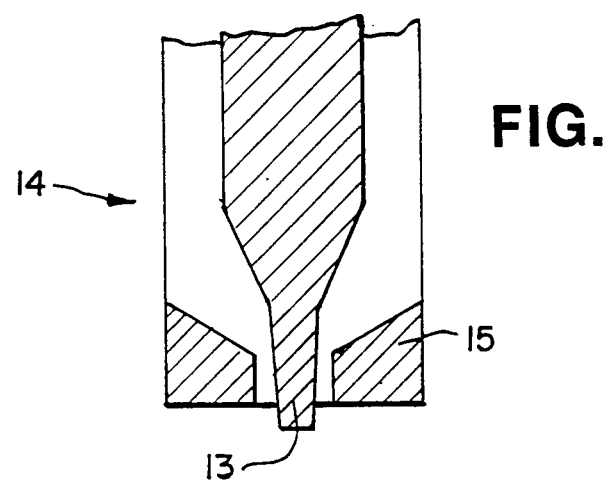

Thus, turning to FIG. 1, a raw silicone rubber blend (not shown) is worked in a conventional rubber extruder 10 which is water-chilled in order to prevent heating which would bring on premature curing of the silicone rubber as it moves down the barrel 12 of the extruder. The silicone tubing emerges through a conventional pin 13 and die 15 (FIG. 1A), identified collectively as 14, in the form of uncured tubing 18 which forms a loop 16 before it passes through a conventional hot-air vulcanizer 20, over take-up reel 22, past idler pulley 24 and through cooling tower 26.

The outer diameter of the tubing may be varied by varying the height of loop 16. A longer loop will neck down the tubing to a greater degree than a shorter loop, since the tubing tends to neck down as long as it is uncured and subject to the force of gravity. This necking down process slows as curing begins in the hot-air vulcanizer 20.

Once the tubing emerges from the hot-air vulcanizer, the curing process is nearly complete. Since the tubing is hot, however, the diameter of the tubing at this point will be somewhat greater than that of the final tubing, at room temperature. Thus, since it is important to monitor the final outside diameter of the tubing, it is passed over a take-up reel 22 and idler pulley 24 through cooling tube 26 which is continuously injected with cool, anti-static air to cool and prevent the silicone tubing from adhering to the sides of the cooling tube.

Monitoring means is provided at 28, to continuously measure the outside diameter of the tubing and to produce an electrical signal indicative thereof. A height sensor 30, connected to monitoring means 28, is positioned below the loop to determine the height A of tubing loop 16 and establish a correspondence between a particular loop height and a particular final tubing outside diameter at room temperature.

Thus, when monitoring means 28 indicates that the outside diameter of the tubing is beginning to waiver from the predetermined value, it signals height sensor 30 which causes take-up reel 22 to either speed up or slow down the movement of the tubing, thereby adjusting the loop to a height which restores the outside diameter of the tubing to the desired value.

The process of this invention can be used not only with single-extruded tubing, but also with coextruded tubing. In such applications, a second extruder 40 is connected to a cross head which combines the extrudate before it enters pin and die 14, to produce a coextruded product. One coextruded product which may be produced in this fashion is a half-clear/half-radiopaque tubing made from clear silicone and silicone containing a radiopaque agent. Such coextruded tubing finds particular application in the medical field.

While particular embodiments of the invention have been shown and described, it will be obvious to those skilled in the art that various changes and modifications may be made therein without departing from the spirit and the scope of the invention and, therefore, it is intended in the appended claims to cover all such changes and modifications which fall within the true spirit and scope of the invention.

What we claim is:

1. A method of extruding tubing which maintains consistently precise dimensions in the final tubing product comprising:
    extruding silicone rubber through a pin and die to produce uncured tubing;
    forming a loop of a predetermined height from the uncured tubing in order to neck the outside diameter of the tubing down to a predetermined value;
    curing the tubing;
    cooling the tubing and producing an electrical signal indicative of the outside diameter of the tubing after cooling; and
    adjusting the height of the loop by adjusting the rate of take-up to compensate for variations in the outside diameter of the tubing from the predetermined value.

2. The method of claim 1 in which the extruded tubing is circular in cross-section.

3. The method of claim 1 in which the extruded tubing is oblong in cross-section.

4. The method of claim 1 in which the extrudate is any thermosetting material which can be extruded through a pin and die to produce tubing.

5. The method of claim 1 in which a coextruded tubing is prepared by using an extrudate formed from two or more different materials.

6. The method of claim 5 in which the extrudate is formed from clear silicone and silicone containing a radiopaque agent.

7. A method of extruding tubing which maintains consistently precise dimensions in the final tubing product comprising:

extruding thermosetting material rubber through a pin and die to produce uncured tubing;

forming a loop of a predetermined height from the uncured tubing in order to neck the outside diameter of the tubing down to a predetermined value;

curing the tubing;

cooling the tubing and producing an electrical signal indicative of the outside diameter of the tubing after cooling; and adjusting the height of the loop by adjusting the rate of take-up to compensate for variations in the outside diameter of the tubing from the predetermined value.

* * * * *